(12) United States Patent
Claesson et al.

(10) Patent No.: US 11,807,323 B2
(45) Date of Patent: Nov. 7, 2023

(54) METHOD AND CONTROL DEVICE FOR ASSEMBLING A VEHICLE

(71) Applicant: Scania CV AB, Södertälje (SE)

(72) Inventors: André Claesson, Tullinge (SE); Linus Ährlig, Västerhaninge (SE); Robert Sjödin, Nyköping (SE)

(73) Assignee: Scania CV AB, Södertälje (SE)

( * ) Notice: Subject to any disclaimer, the term of this patent is extended or adjusted under 35 U.S.C. 154(b) by 219 days.

(21) Appl. No.: 17/421,035

(22) PCT Filed: Nov. 26, 2019

(86) PCT No.: PCT/SE2019/051197
§ 371 (c)(1),
(2) Date: Jul. 7, 2021

(87) PCT Pub. No.: WO2020/149774
PCT Pub. Date: Jul. 23, 2020

(65) Prior Publication Data
US 2022/0055702 A1  Feb. 24, 2022

(30) Foreign Application Priority Data
Jan. 16, 2019  (SE) .................................... 1950049-5

(51) Int. Cl.
*B62D 65/04* (2006.01)
*B62D 63/02* (2006.01)
(Continued)

(52) U.S. Cl.
CPC ................ *B62D 65/04* (2013.01); *B60K 1/02* (2013.01); *B60K 7/0007* (2013.01); *B60P 3/42* (2013.01);
(Continued)

(58) Field of Classification Search
CPC ........ B62D 65/04; B62D 63/025; B60K 1/02; B60K 7/0007; B60P 3/42; B60W 60/0023
(Continued)

(56) References Cited

U.S. PATENT DOCUMENTS 4,897,012 A * 1/1990 Brewer ................ B65G 47/962
187/407
5,350,033 A * 9/1994 Kraft ...................... B25J 9/0003
180/6.58
(Continued)

FOREIGN PATENT DOCUMENTS

CN  103415425 A  11/2013
CN  103596829 A  2/2014
(Continued)

OTHER PUBLICATIONS

Scania CV AB, Chinese Patent Application No. 201980075976.6, First Office Action, dated May 7, 2022.
(Continued)

*Primary Examiner* — Jaime Figueroa
(74) *Attorney, Agent, or Firm* — Moore & Van Allen PLLC; W. Kevin Ransom

(57) ABSTRACT

A method for assembling a vehicle from a set of modules for travelling a planned route, wherein the set of modules comprises at least one functional module and a plurality of drive modules. Each drive module comprises a pair of wheels, electrical motor, and an interface releasably connectable to a corresponding interface on another module, wherein each drive module is configured to operate autonomously and has an individual set of energy parameters. The method comprising obtaining route information associated with route segments of the planned route, selecting a first drive module having an individual set of energy parameters matching route information associated with a first route segment and selecting a second drive module having an
(Continued)

individual set of energy parameters matching route information associated with a second route segment, and thereafter commanding the drive modules to connect together and with a functional module.

15 Claims, 3 Drawing Sheets

(51) Int. Cl.
  *B60W 60/00* (2020.01)
  *B60K 1/02* (2006.01)
  *B60K 7/00* (2006.01)
  *B60P 3/42* (2006.01)
  *G01C 21/34* (2006.01)

(52) U.S. Cl.
  CPC ....... *B60W 60/0023* (2020.02); *B62D 63/025* (2013.01); *G01C 21/3492* (2013.01); *B60W 2554/408* (2020.02); *B60W 2555/60* (2020.02); *B60W 2556/10* (2020.02); *B60W 2556/50* (2020.02)

(58) Field of Classification Search
  USPC .......................................................... 701/414
  See application file for complete search history.

(56) References Cited

U.S. PATENT DOCUMENTS

| | | | |
|---|---|---|---|
| 5,934,397 A | 8/1999 | Schaper | |
| 6,059,058 A * | 5/2000 | Dower | B60L 50/52 180/65.265 |
| 6,672,413 B2 * | 1/2004 | Moore | G01R 31/34 180/9.21 |
| 6,679,543 B2 * | 1/2004 | Messano | B60P 3/34 296/210 |
| 6,882,917 B2 * | 4/2005 | Pillar | B60L 50/15 701/48 |
| 6,889,783 B1 * | 5/2005 | Moore | G01R 31/34 180/9.21 |
| 7,987,937 B2 * | 8/2011 | Gonzalez-Salvador | B62D 25/084 296/193.04 |
| 8,210,300 B2 * | 7/2012 | Gonzalez-Salvador | B62D 65/04 296/193.04 |
| 8,336,901 B2 * | 12/2012 | Andre | B62D 47/025 105/8.1 |
| 8,479,851 B2 * | 7/2013 | Mack | B60L 50/16 180/65.6 |
| 8,870,698 B2 * | 10/2014 | Mack | H02K 7/116 475/150 |
| 9,085,302 B2 * | 7/2015 | Borroni-Bird | B60T 13/74 |
| 9,441,555 B2 | 9/2016 | Abdul-Rasool et al. | |
| 9,598,062 B2 | 3/2017 | Kumar et al. | |
| 9,802,661 B1 * | 10/2017 | Kentley-Klay | B62D 63/025 |
| 9,845,123 B2 * | 12/2017 | Byrnes | B60L 50/60 |
| 9,849,880 B2 | 12/2017 | D'Amato et al. | |
| 10,207,757 B2 * | 2/2019 | Scaringe | G06Q 30/0645 |
| 10,300,783 B2 * | 5/2019 | Calleija | B60K 7/0007 |
| 10,545,509 B1 * | 1/2020 | Jessen | B62D 63/025 |
| 11,454,985 B1 * | 9/2022 | Jessen | G05D 1/0055 |
| 2002/0104693 A1 * | 8/2002 | Moore | B62D 57/024 180/9.1 |
| 2002/0153745 A1 * | 10/2002 | Messano | B60P 3/34 296/156 |
| 2002/0175007 A1 * | 11/2002 | Strong | E02F 9/0841 180/54.1 |
| 2003/0040933 A1 * | 2/2003 | Chernoff | B62D 5/00 705/26.1 |
| 2004/0002794 A1 * | 1/2004 | Pillar | B65F 3/045 701/1 |
| 2004/0020002 A1 * | 2/2004 | Moore | B62D 57/024 15/340.1 |
| 2005/0234622 A1 * | 10/2005 | Pillar | B60L 3/12 701/41 |
| 2006/0108161 A1 | 5/2006 | Feliss et al. | |
| 2006/0237239 A1 * | 10/2006 | Bruner | B62D 55/12 180/9.1 |
| 2007/0199748 A1 * | 8/2007 | Ross | B60K 7/0007 180/65.51 |
| 2008/0258899 A1 * | 10/2008 | Stiles | B60Q 1/305 340/471 |
| 2008/0308332 A1 * | 12/2008 | Gonzalez-Salvador | B62D 65/04 296/193.04 |
| 2011/0089666 A1 * | 4/2011 | Andre | B62D 47/025 280/403 |
| 2011/0094806 A1 * | 4/2011 | Mack | B60L 50/16 180/65.6 |
| 2011/0241382 A1 * | 10/2011 | Gonzalez-Salvador | B62D 65/04 296/193.04 |
| 2014/0262583 A1 * | 9/2014 | Url | B62D 33/023 296/183.1 |
| 2015/0046000 A1 | 2/2015 | Zhao et al. | |
| 2015/0083509 A1 * | 3/2015 | Borroni-Bird | B60W 10/08 180/204 |
| 2016/0129958 A1 * | 5/2016 | Byrnes | B60L 15/32 180/12 |
| 2016/0207418 A1 * | 7/2016 | Bergstrom | B60G 3/08 |
| 2017/0197678 A1 * | 7/2017 | Scaringe | B60K 1/00 |
| 2017/0197679 A1 * | 7/2017 | Scaringe | B60K 1/02 |
| 2018/0022208 A1 * | 1/2018 | Calleija | B60K 7/0015 180/2.2 |
| 2018/0039285 A1 * | 2/2018 | Giegel | B65B 17/02 |
| 2018/0050626 A1 * | 2/2018 | Delp | B60L 50/60 |
| 2018/0345971 A1 * | 12/2018 | Birnschein | B60K 17/354 |

FOREIGN PATENT DOCUMENTS

| | | |
|---|---|---|
| CN | 105644559 A | 6/2016 |
| CN | 106043300 A | 10/2016 |
| CN | 107813814 A | 3/2018 |
| DE | 9405367 U1 | 6/1994 |
| DE | 102016209099 A1 | 7/2017 |
| DE | 102018002229 A1 | 8/2018 |
| WO | 2017207978 A1 | 12/2017 |
| WO | 2018222375 A1 | 12/2018 |

OTHER PUBLICATIONS

Scania CV AB, International Patent Application No. PCT/SE2019/051197, International Preliminary Report on Patentability, dated Jun. 16, 2021.
Scania CV AB, European Patent Application No. 19910498.5, Extended European Search Report, dated Sep. 13, 2022.
Scania CV AB, International Patent Application No. PCT/SE2019/051197, International Search Report, dated Feb. 13, 2020.
Scania CV AB, International Patent Application No. PCT/SE2019/051197, Written Opinion, dated Feb. 13, 2020.
Scania CV AB, Swedish Application No. 1950049-5, Office Action, dated Aug. 21, 2019.
Scania CV AB, Brazilian Patent Application No. BR112021009749-0, Preliminary Office Action, dated Jul. 4, 2023.

* cited by examiner

METHOD AND CONTROL DEVICE FOR ASSEMBLING A VEHICLE

CROSS-REFERENCE TO RELATED APPLICATIONS

This application is a National Stage Patent Application (filed under 35 § U.S.C. 371) of PCT/SE2019/051197, filed Nov. 26, 2019 of the same title, which, in turn claims priority to Swedish Patent Application No. 1950049-5 filed Jan. 16, 2019 of the same title; the contents of each of which are hereby incorporated by reference.

TECHNICAL FIELD

The present disclosure relates to techniques in the context of vehicles, and to a method for assembling a vehicle from a set of modules to be arranged for travelling a planned route. The disclosure also relates to a corresponding control device, to a computer program for performing the proposed method and to a computer-readable medium.

BACKGROUND

Vehicles of today are typically manufactured for a specific purpose, e.g. a bus is manufactured for transporting people and a truck is manufactured for transporting goods. Such vehicles are typically manufactured and completely assembled in a factory or they may be partly assembled in a factory and completed at a body manufacturer. Once the vehicle is assembled, the vehicle may be used for the specific purpose. Thus, a bus may be used as a bus and a garbage truck may be used as a garbage truck. Different vehicles are thus needed for different purposes, which may require a large fleet of vehicles and which may be very costly. A more flexible vehicle which enables customization may therefore be desired.

There are, for example, known solutions where a truck can be rebuilt by exchanging a concrete mixer for a loading platform. This increases the flexibility and two different functions can be achieved by means of one single vehicle. Also, document WO2017/207978A1 discloses an autonomous container transportation vehicle, comprising a chassis configured to receive a container to be transported. In this document, two or more of the autonomous container transportation vehicles can be combined with a container to form a transportation apparatus.

SUMMARY

According to WO2017/207978A1, a vehicle management unit determines a number of autonomous container transportation vehicles to assign to the container. The number may depend on factors such as size and/or mass of the container and may take into account the route on which the container is to be transported. However, the autonomous container transportation vehicles seem to be treated as static units with more or less the same properties.

It is an object of the disclosure to alleviate at least some of the drawbacks with the prior art. It is a further object to provide a method how to select modules for assembling a vehicle such that the assembled vehicle is configured to efficiently drive a planned route.

These objects and others are at least partly achieved by a method and a control device according to the independent claims, and by the embodiments according to the dependent claims.

According to a first aspect, the disclosure relates to a method, performed in a control device, for assembling a vehicle from a set of modules to be arranged for travelling a planned route. The set of modules comprises at least one functional module and a plurality of drive modules. Each drive module comprises a pair of wheels and at least one electrical motor arranged to operate the pair of wheels. Each drive module is also configured to be autonomously operated and is individually associated with an individual set of energy parameters. Also, each module in the set of modules comprises at least one interface releasably connectable to a corresponding interface on another module. The method comprising obtaining route information associated with route segments of the planned route. The method also comprises selecting a first drive module which individual set of energy parameters is matching route information associated with a first route segment of the planned route and selecting a second drive module which individual set of energy parameters is matching route information associated with a second route segment of the planned route. The method also comprises commanding the first drive module and the second drive module to connect themselves with the at least one functional module.

With the presented solution, a method for selecting modules for assembling a vehicle is obtained, such that the assembled vehicle can drive energy efficiently along at least part of the planned route. By having route information, e.g. properties, of the planned route, the vehicle can be assembled from drive modules that match at least some of the properties such that energy consumption is reduced, and/or the vehicle can perform the transport mission efficiently.

In some embodiments, the route information comprises information about at least one of topology, speed restrictions, road conditions, traffic conditions. Thus, information of the topology of the road, speed restrictions along the road, road conditions such as bumpy road or road works, traffic conditions such as traffic congestion, or other information such as urban environment or extra-urban environment, may be taken into consideration. Thereby, the drive modules can be selected to match specific circumstances for the route, whereby efficiency may be increased when driving along the route.

In some embodiments, the individual set of energy parameters is indicative of a gear ratio for the respective drive module. The selecting a first drive module then comprises selecting a first drive module having a gear ratio matching route information associated with the first route segment of the planned route. The selecting a second drive module comprises selecting a second drive module having a gear ratio matching route information associated with the second route segment of the planned route, wherein the gear ratio of the first drive module includes a gear ratio being different from any gear ratio of the second drive module. By selecting the drive modules to have different gear ratios, a kind of electrical gear or transmission is accomplished, as the drive modules having different gear ratios may be alternately used by the vehicle. The need to have a mechanical gear box is thereby removed, and then also the negative impact of having a mechanical gear box such as heavy weight and dirtiness. Further, as no mechanical gear box is needed, the complexity of the powertrain is reduced, and costs may be reduced.

In some embodiments, the individual set of energy parameters is indicative of at least one of: a weight of the at least one functional module and/or type of load of the at least one functional module, a motor power available for the drive module, a state of charge, SOC, available for the drive module. Thus, a plurality of different kinds of properties of the drive module, or the functional module that is to be assembled to the drive module and thereby may have an impact on the performance of drive module, may be taken into account when selecting appropriate drive modules.

In some embodiments, the selecting of the first drive module comprises selecting a first drive module which individual set of energy parameters is matching route information associated with the first route segment of the planned route such that the vehicle is predicted to meet at least one efficiency criterion while travelling along the first route segment, and/or wherein the selecting of a second drive module comprises selecting a second drive module which individual set of energy parameters is matching route information associated with the second route segment of the planned route such that the vehicle is predicted to meet at least one efficiency criterion while travelling along the second route segment. Thus, the selection is made such that energy efficiency of the vehicle is increased when driving along the planned route.

In some embodiments, the individual set of energy parameters is indicative of a most efficient speed or speed interval, where the drive module is driving most efficiently. The selecting a first drive module then comprises selecting a first drive module having a most efficient speed or speed interval matching route information associated with the first route segment of the planned route. The selecting a second drive module comprises selecting a second drive module having a most efficient speed or speed interval matching route information associated with the second route segment of the planned route, wherein the most efficient speed of the first drive module is different from the most efficient speed of the second drive module, and/or wherein the most efficient speed interval of the first drive module and the most efficient speed interval of the second drive module are at least partly non-overlapping. Thus, drive modules may then be easily matched to the route segments e.g. based on speed restrictions. Also, by having drive modules that are selected for driving efficiently at different route segments, a kind of electrical gear or transmission is accomplished, as the drive modules having different efficient speed or speed intervals may be alternately used by the vehicle.

According to a second aspect, the disclosure relates to a control device for assembling a vehicle from a set of modules, to be arranged for travelling a planned route. The set of modules comprises at least one functional module and a plurality of drive modules. Each drive module comprises a pair of wheels and at least one electrical motor arranged to operate the pair of wheels. Each drive module is also configured to be autonomously operated and is individually associated with an individual set of energy parameters. Also, each module in the set of modules comprises at least one interface releasably connectable to a corresponding interface on another module. The control device is configured to obtain route information associated with route segments of the planned route. The control device is also configured to select a first drive module which individual set of energy parameters is matching route information associated with a first route segment of the planned route, and to select a second drive module which individual set of energy parameters is matching route information associated with a second route segment of the planned route. The control device is also configured to command the first drive module and the second drive module to connect themselves with the at least one functional module. The same positive effects as with the method may be achieved with the control device.

According to a third aspect, the disclosure relates to a drive module configured to be autonomously operated and is individually associated with an individual set of energy parameters. The drive module comprising a pair of wheels, at least one electrical motor arranged to operate the pair of wheels, at least one interface releasably connectable to a corresponding interface on another module, and a control device according to the second aspect.

According to a fourth aspect, the disclosure relates to a vehicle comprising at least one drive module according to the third aspect.

According to a fifth aspect, the disclosure relates to a computer program comprising instructions which, when the program is executed by a computer, cause the computer to carry out the method according to the first aspect.

According to a sixth aspect, the disclosure relates to a computer-readable medium comprising instructions which, when executed by a computer, cause the computer to carry out the method according to the first aspect.

DETAILED DESCRIPTION

One way of meeting customers' different vehicle needs in a flexible and cost-efficient way is to use a modularised vehicle assembled from a set of modules may. A modularised vehicle according to the present disclosure is typically assembled at the customer's premises and the customer may thus buy a set of modules from a manufacturer. The modular vehicle can easily be assembled and re-assembled e.g. to perform a certain mission. The present disclosure is applicable on all sorts of road vehicles. However, the disclosure may relate to heavy vehicles, such as buses, trucks etc. Specifically, the present disclosure may relate to vehicles for use on public roads.

A method is herein proposed, for assembling a vehicle from a set of modules, to be arranged for travelling a planned route. The vehicle is assembled from drive modules that are individually selected based on information associated with a planned route for accomplishing a transport mission. The vehicle is assembled by at least one functional module for performing a certain function (such as carrying a load), and two or more drive modules to be used for driving the vehicle. The drive modules are selected to match route information associated with route segments of a planned route for the vehicle. Thereby, the vehicle may use different drive modules to propel the vehicle during different route segments, such that the vehicle is driven efficiently while driving along those route segments. For example, a drive module is configured for urban conditions and another drive module is configured for uphill are selected. During the route segment(s) where urban conditions exists, e.g. very low speed restrictions, the drive module configured for urban conditions is used to propel the vehicle. During the route segment(s) where an uphill exists, the drive module configured for uphill is used to propel the vehicle.

For better understanding of the technology, the parts used for assembling a vehicle will be explained. Thereafter a method for assembling a vehicle will be explained.

Figure 1:
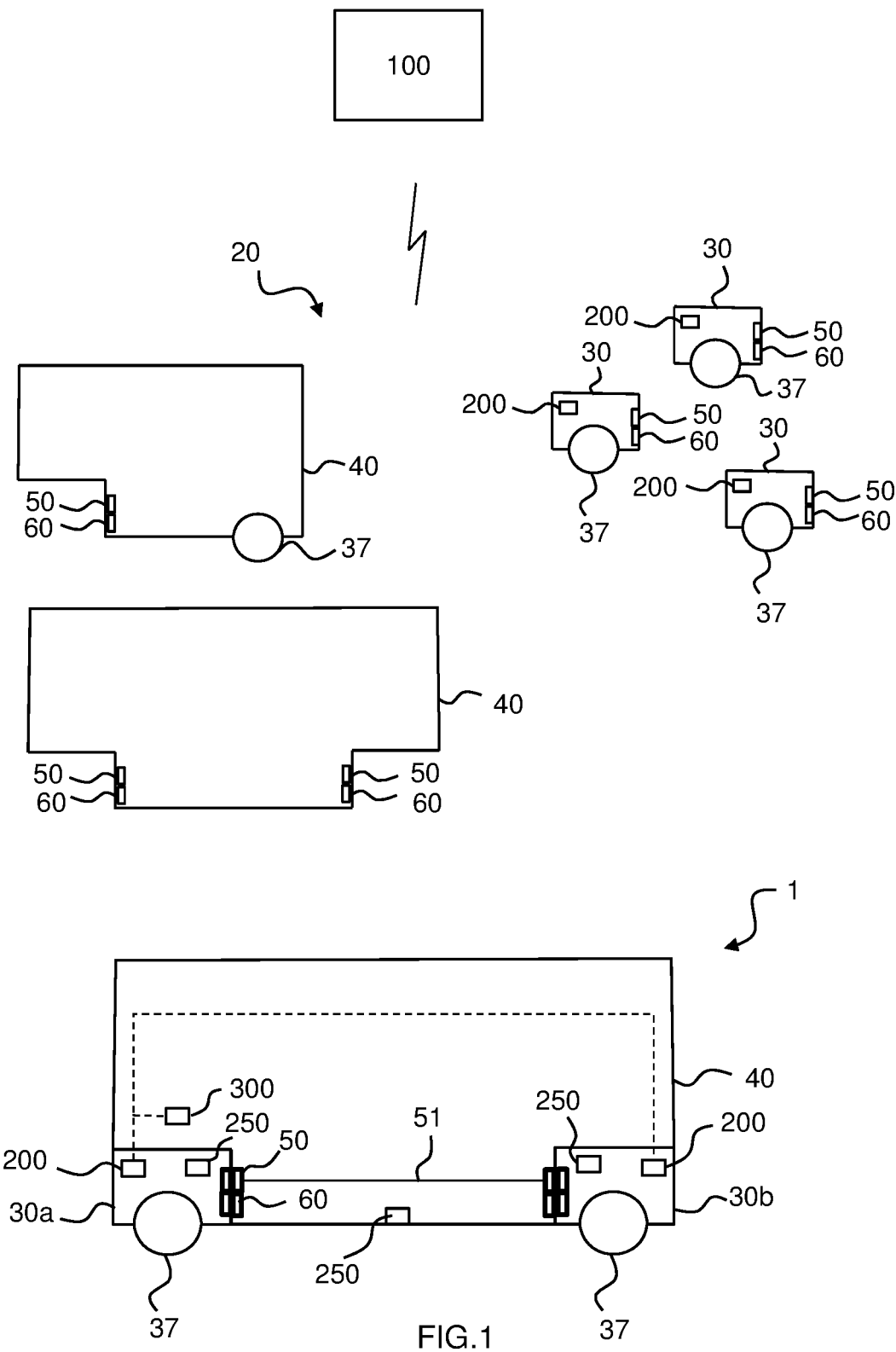
FIG. 1 illustrates a set of modules, a vehicle assembled from the set of modules, and an off-board system.

FIG. 1 illustrates an example set of modules 20 for assembling a vehicle 1. An off-board system, comprising a control device 100, and an example of an assembled vehicle 1 are also illustrated. The set of modules 20 comprises a plurality of drive modules 30 and a plurality of functional modules 40.

The drive modules' 30 main function is typically to drive (e.g. propel, steer and brake) a vehicle 1. The drive modules 30 comprise a pair of wheels 37 and are configured to be autonomously operated. The functional modules are configured to perform a certain function such as to carry a load, e.g. goods or people. Each module 30, 40 in the set of modules 20 comprises at least one interface 50 releasably connectable to a corresponding interface 50 of another module 30, 40. The drive modules 30 may be remotely controlled from a control device 100 in an off-board system.

By combining drive modules 30 and functional modules 40 different types of vehicles 1 can be achieved. Some vehicles 1 require two or more drive modules 30 and some vehicles 1 only require one drive module 30, depending on the structural configuration of the functional module 40. Each drive module 30 comprises a control device 200 and may thus communicate with a control center or off-board system, i.e. the control device 100. Since the drive modules 30 may be configured to be operated as independently driven units by means of the control devices 200 of the drive modules 30, the drive modules 30 may be connected to, or disconnected from, the functional module(s) 40 without manual work.

The control devices 200 in the first drive module 30a and the second drive module 30b are in the assembled vehicle 1 in FIG. 1 denoted 200a and 200b, respectively.

In some embodiments, each module 30, 40 of the vehicle 1 comprises an individual sensor arrangement 250. Alternatively, in some embodiments, only each drive module 30 comprises an individual sensor arrangement 250. In still another embodiment, only the functional module 40 comprises an individual sensor arrangement 250c. A sensor arrangement 250 may comprise one or several sensors. The one or several sensors may include sensors for monitoring the environment, and/or monitoring vehicle driving behaviour or other vehicle properties. For example, the one or several sensors may include at least one camera, at least one lidar, at least one ultrasonic sensor, at least one radar, at least one accelerometer, at least one gyro meter, a weight sensor, a suspension action sensor, a weight sensor and/or a positioning sensor. Sensor data from one or several sensors in such sensor arrangement 250 may be used to determine information of the route ahead, thus road properties such as altitude or road conditions.

Figure 2:
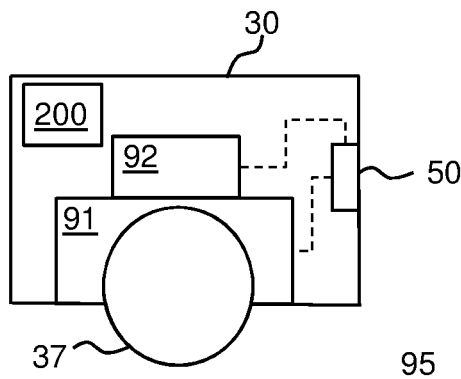
FIG. 2 schematically illustrates a drive module in further detail in a side view.

FIG. 2 schematically illustrates a drive module 30 in further detail in a side view. The drive module 30 comprises at least one (only one illustrated) propulsion system 91, an energy storage device 92, an interface 50 and a control device 200.

Figure 3:
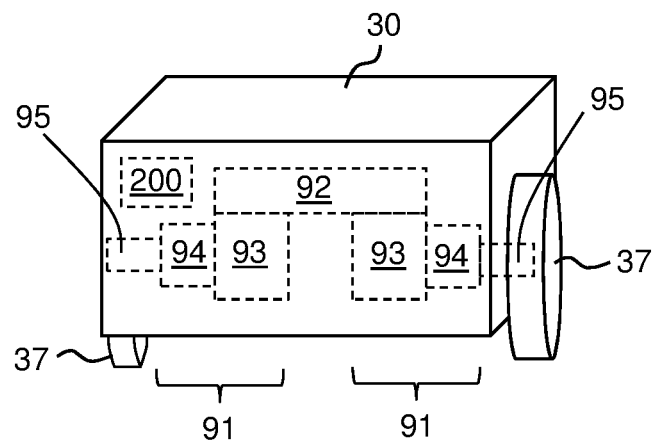
FIG. 3 schematically illustrates a drive module in further detail in a front view.

FIG. 3 schematically illustrates the drive module 30 of FIG. 2 in a further detail in an angled front view. In this embodiment, each wheel 37 of the pair of wheels is configured to be operated, e.g. rotated, by an individual propulsion system 91. Alternatively, the pair of wheels are operated by a common propulsion system. In some embodiments, and as illustrated in FIG. 3, the propulsion system 91 comprises an electrical machine 93, i.e. an electrical motor, and a gear device 94. Thus, in some embodiments, each wheel 37 is individually driven by its own electric machine 93. One wheel 37 is arrange to an output shaft 95 of the gear device 94, typically via a hub (not shown). The gear device 94 is arranged to an output shaft of the electrical motor. In some embodiments, the gear device 94 has a fixed gear ratio. The gear device 94 is for example a planetary gear device. Typically, an individual gear device 94 is configured to provide one or several gear ratios, for example one, two, three or four mutually different individual gear ratios. Examples of such gear ratios is e.g. 1:1, 1:2, 1:3, 1:4, 1:5, 1:6 etc. The gear ratios shall be seen from the electrical machine, thus, a gear ratio of 1:2 means that for two revolutions of the driver (electrical machine), the driven gear (e.g. output axis from the gear device) has made one revolution. Thus, in one example, a first gear device 94 of a first propulsion system 91 of the drive module 30 may have gear ratios of 1:1, 1:2 and 1:3. A second gear device 94 of a second propulsion system 91 the drive module 30 may have gear ratios of 1:4, 1:5 and 1:6. According to one embodiment, while driving, it is only one of the propulsion systems 91 of one of the drive modules 30 that is active and operates one wheel, the other wheels are only following. Of course, the gear ratios of the propulsion systems 91 of one drive module 30 may be equal.

In some embodiments, an individual gear device 94 is configured to provide one static gear ratio. Then, the gear ratio of the individual gear device 94 cannot be changed. In case the drive module 3 comprises two propulsion systems 91, as in FIG. 3, the respective gear devices 94 of the propulsion systems 91 have equal gear ratios. Equal gear ratios imply the same number of different gear ratios, and the same sizes of the respective gear ratios.

In an alternative embodiment, the drive module 30 comprises only one propulsion system 91. In such embodiment, the one propulsion system is configured to operate both wheels 37 of the pair of wheels, thus, the pair of wheels are operated by a common propulsion system. The one propulsion system comprises for example an electrical machine, i.e. an electrical motor, and a gear device. The gear device may be a pinion gear. For example, the gear device may include a pinion and a crown wheel. The gear device is arranged to the output shaft of the electrical motor, and the gear device operates on wheel shafts that are connected to the wheels 37. The gear device may e.g. include a differential.

It should here be understood that the gear ratios or the gear devices are comparable as the electrical machines are here considered to have the same power output (the same available motor power) and the same dimensions of output axis etc.

Alternatively, the electrical machines of different drive modules 30 have different available motor power, and thus different nominal speeds. For example, one electrical machine may have a nominal speed of 2000 revolutions per minute (rpm), and another electrical machine may have a nominal speed of 4000 rpm. If the gear ratios for the electrical machines are the same, the electrical machines and thus their respective drive module will then have different speeds or speed intervals where they operate most efficiently.

In some other embodiments, where the electrical machines of different drive modules 30 have different available motor power, also the gear ratios are different. The gear ratios have then been carefully selected such that the electrical machines and thus their respective drive module have different speeds or speed intervals where they operate most efficiently. Thus, when selecting a drive module in the method to be explained in the following, one may also consider the available motor power, i.e. the nominal speed of the electrical machine, in relation to the gear ratio of the drive module. Thus, the optimal speed or speed interval of a drive module where it operates most efficiently may be determined based of the available motor power and the gear ratio of the drive module.

The drive modules 30 are individually associated with an individual set of energy parameters. Thus, each drive module 30 is associated with an individual set of energy parameters. A set of energy parameters associated with a drive module 30 describes or is indicative of energy properties of the same drive module 30, or energy properties that may affect the same drive module 30. For example, energy properties such as a most efficient speed or speed interval of the drive module 30, a most efficient acceleration or acceleration interval of the drive module 30, one or several individual gear ratios for the drive module 30, an amount of energy available to the drive module 30, for example State Of Charge (SOC), a weight of the at least one functional module 40 and/or type of load of the at least one functional module 40 to be assembled with the drive module 30, and/or a motor power available for the drive module 30.

As previously described, a drive module 30 may only have one propulsion system 91 with one gear device that specifies the gear ratio(s) of the drive module 30. Alternatively, the drive module 30 may thus have two propulsion systems 91, each with one individual gear device. The two gear devices of one drive module 30 together specify the available gear ratio(s) or the drive module 30. Thus, if one of the gear devices has only one gear ratio of 1:1, and the other has only two gear ratios of 1:1 and 1:2, the available gear ratios of the drive module 30 are 1:1 and 1:2.

A gear ratio is generally associated with a preferred speed or speed interval of the drive module 30, where the propulsion system 91 of the drive module 30 achieves the greatest efficiency. Also, the gear ratio may be associated with a preferred acceleration or acceleration interval, where the propulsion system 91 manage to accelerate most efficiently. Thus, a drive module 30 may be defined by the gear ratio(s) of its propulsion system(s) 91, to have an optimal efficiency (thus be most efficient) for a certain speed or speed interval, and/or acceleration or acceleration interval. Hence, a drive module 30 may be designed to be driven most efficiently at a certain speed or in a certain speed interval. Also, a drive module 30 may be designed to accelerated with a certain acceleration or in a certain acceleration interval most efficiently. In other words, in some embodiments, the individual gear ratios are individually associated with a most efficient speed or speed interval of the respective associated drive module 30, and/or a most efficient acceleration or acceleration interval of the respective associated drive module 30.

The electric machine(s) may also work as generators and generate electric energy when braking the wheels 37. Thus, the propulsion system is typically the primary braking system of the vehicle 1. However, because the primary braking system may in some situations be insufficient or fail for some reason, a secondary braking system is required. This secondary braking system is herein referred to as the braking system. The braking system comprises for example standard disc brakes and electromechanical actuators that require reliable power supply.

The drive module 30 also comprises at least one energy storage device 92 for supplying power to the propulsion system(s) 91. The energy storage device 92 is for example an electric battery that may be recharged with electric energy. The drive module 30 may also comprise a navigation unit (not shown), comprising a positioning unit using the Global Positioning System (GPS), in order to navigate between different positions.

Figure 6:
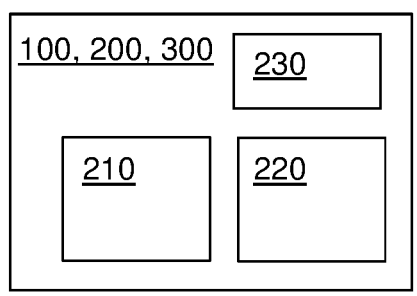
FIG. 6 illustrates an example implementation of a control device according to the second aspect.

The control device 200 is configured to operate the drive module 30 as an independently driven unit. The drive module 30 may transport itself without any externally driven unit such as a towing vehicle. The drive module 30 may transport itself by means of the at least one propulsion system 91. The drive module 30 may be configured to be autonomously operated. Thus, the control device 200 may be configured to control the operation of the drive module 30. The control device 200 may be configured to transmit control signals to the various systems and components of the drive module 30 for controlling for example the steering and the propulsion of the drive module 30. The control device 200 may be configured to operate the drive module 30 autonomously based on received commands. The control device 200 may thus be configured to receive commands from a remotely located off-board system i.e. the control device 100 of the off-board system, and to convert the commands into control signals for controlling the various systems and components of the drive module 30. The control device 200 may also be configured to receive data about the surroundings from at least one sensor and based on this data control the drive module 30. The control device 200 will be described in further detail in connection with FIG. 6.

The drive module 30 may be configured to be releasably connected to either a second drive module 30 and/or a functional module 40 for forming an assembled vehicle 1. The at least one interface 50 of the drive module 30 is configured to physically connect the drive module 30 with a second drive module 30 and/or a functional module 40. The interface(s) 50 of the drive module 30 may be releasably connectable to a corresponding interface 50 of a second drive module 30 and/or a functional module 40.

In FIG. 1 the drive modules 30 are illustrated with only one interface 50, on one side of the drive module 30, However, it is to be understood that each drive module 30 may comprise a plurality of interfaces 50 for releasable connection with other modules 40. The interface(s) 50 of the drive modules 30 may be arranged on different sides of the drive module 30 and thus enable connection with other modules 30, 40 on multiple sides of the drive module 30. The interfaces 50 on the drive modules 30 and the functional modules 40 respectively, are suitably arranged on corresponding positions to enable connection between the modules 30, 40.

In some embodiments, the at least two interfaces 50 comprises electric interfaces, arranged for transferring electric power and/or transmitting electric signals between the drive module 30 and another module e.g. to a functional module 40 to which the drive module is connected. The electrical interface 50 may be a wireless interface such as conductive interface. In other words, by connecting the drive module 30 and the functional module 40 electrically the modules 30, 40 may transfer power between each other and share information. The drive module 30 may, for example, control parts of the functional module 40, such as opening and closing of doors, heating and cooling. Also, one drive module 30 of the modular vehicle 1 may transmit electric power and/or electric signals via a functional module 40 and further to another drive module of the same vehicle 1, as illustrated by the connection 51 in FIG. 1. Thus, the connection 51 comprises e.g. at least one of a cable, bus or electrical line.

In some embodiments, the control device 200 of the drive module 30 is configured to communicate with another drive module 30 being a part of the same assembled vehicle 1, as illustrated by dashed lines in FIG. 1. In some embodiments, the control device 200 of the drive module 30 is configured to communicate with a further control device e.g. a control device 300 of a functional module 40. The communication between the modules 30, 40 may be wireless or conductively or by wire. The wireless communication may be directly between the modules or via the off-board system (i.e. control device 100). The modules 30, 40 of an assembled vehicle may communicate with each other and/or the control device 100 via 4G, 5G, V2V (Vehicle to Vehicle), Wi-Fi or any other wireless communication means.

Considering an assembled vehicle 1 comprises two drive modules, the control device 100 of the off-board system may appoint one drive module to be master drive module and the other to be slave drive module.

Figure 4:
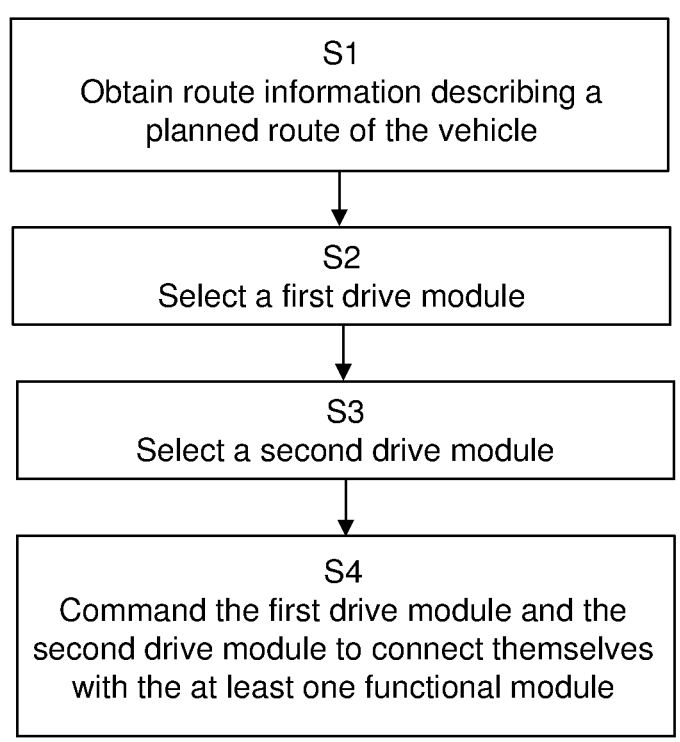
FIG. 4 illustrates a method for configuring operation of a vehicle according to the first aspect.

The proposed technique will now be explained with reference to the flow chart of FIG. 4. As previously described, this disclosure proposes, according to a first aspect, a method for assembling a vehicle. The method may be implemented as a computer program comprising instructions which, when the program is executed by a computer (e.g. a processor in a control device 100 of the off-board system, a control device 200 of a drive module, or a control device 300 of a functional module), cause the computer to carry out the method. According to some embodiments the computer program is stored in a computer-readable medium (e.g. a memory or a compact disc) that comprises instructions which, when executed by a computer, cause the computer to carry out the method. The proposed method is e.g. performed in a control device 100 of the off-board system. Alternatively, the method is performed in a control device 200 of drive module 30 assigned to be a master drive module, or in a control device of a functional module 40. However, it must be appreciated that the implementation may be distributed among several or all of the control devices 100, 200, 300.

An operator may receive a mission from a client to transport goods from one location to another. The operator enters the information about the transport mission into the control device 100 off the off-board system via a user interface, such as a touch screen or similar. It should be pointed out that this is merely an example, and that the received mission may alternatively be automatically translated and/or inputted to the control device 100, In response, the control device 100 determines a planned route to be followed in order to accomplish the transport mission. Alternatively, also the planned route may be input to the control device 100. The control device 100 collects route information of the planned route. The route information may come from various sources, such as a navigation system with maps and route information, information from traffic centrals, etc. The control device 100 may divide the planned route into route segments, or road segments, based on the information, where a route segment typically has one property that is the same for the whole stretch of the route segment, e.g. the same speed restriction. Thus, the method comprises obtaining S1 route information associated with route segments of the planned route. The planned route may be divided into route segments based on for example existing properties such as topology, speed restrictions, road conditions or traffic conditions etc., on the planned route. For example, a route segment may encompass an uphill, a downhill, a traffic roadwork etc. Each route segment is associated or related to route information that indicates such properties of the route segment. Thus, in some embodiments, the route information comprises information about at least one of topology, speed restrictions, road conditions, traffic conditions, of the route segment. The route segments are here referred to as a first route segment and a second segment, but is should be understood that the planned route may comprise more than the two route segments. The first route segment and the second route segment are for example chosen as being the route segment of the planned route which are most important to take into account, in terms of having an impact on the efficiency of the vehicle, and where the efficiency may be increased by selecting a drive module 30 that match the route segment.

The control device 100 then determines which function to be performed and thus which type of vehicle 1 is required to complete the mission. In this example, the required vehicle 1 may be a truck. The control device 100 selects modules 30, 40 to use for the required truck. The type of vehicle 1 and the modules 30, 40 required to complete the mission may for example be selected based on information about the goods, the distance to travel and/or the geographical location. In particular, the type of drive modules 30 to select is determined based on route information associated with route segments of the planned route, and on energy parameters associated each drive module 30. Each drive module 30 of the set of drive modules 20 is individually associated with an individual set of energy parameters. A set of energy parameters associated with a drive module 30 for example describes energy properties of the same drive module 30, or energy properties that affects the drive module 30. For example, energy properties such as a gear ratio, a weight of the at least one functional module 40 and/or type of load of the at least one functional module 40 to be assembled with the drive module 30, a motor power available for the drive module 30 or a state of charge, SOC, available for the drive module 30. The weight of the at least one functional module 40, or weight of the load of the at least one functional module 40, or typo of load, is for example sent from the off-board system of the at least one functional module 40, to the drive module 30 that is to be included in the assembled vehicle 1. The drive module 30 then includes this information into the energy parameters of the drive module 30. The mission may also comprise more detailed information of the driving mission, for example details of a planned route of the vehicle 1 including a destination and a starting point or position, waypoints, information about the goods, a distance to travel and/or one or several geographical locations etc.

The method further comprises selecting S2 a first drive module 30a which individual set of energy parameters is matching route information associated with a first route segment of the planned route. The method also comprises selecting S3 a second drive module 30b which individual set of energy parameters is matching route information associated with a second route segment of the planned route. As there are a plurality of drive modules 30 to choose from, a selection from them can be made to suit the planned route for accomplishing the next transport mission efficiently. The matching is for example made using a predetermined scheme or table, where energy parameters, e.g. different types of energy parameters, are paired with route information, e.g. different types of route information. For example, different gear ratios are paired with different types of route information. For example, road-works are paired with gear ratios configured for low speeds, topology indicative of uphill is paired with high motor power available for the drive module 30, topology indicative of downhill is paired with low SOC available for the drive module 30. The drive module 30 (e.g. of the set of drive modules 20, FIG. 1) which energy properties best matches the route information associated with the intended route segment is selected. In some embodiments, where there is no appropriate drive module 30 to select that match one of the road segments, another road segment of the planned route may be chosen to match with. Alternatively, a "second best" drive module 30 is selected.

After the selection of the two modules, the method comprises commanding S4 the first drive module 30*a* and the second drive module 30*b* to connect themselves with the at least one functional module 40. Thus, the control device 100 converts the mission into a command for the two selected drive modules 30 to physically and electrically connect with the selected functional module 40 for the emission. The control devices 200 of the drive modules 30 each receives the command and converts the command to control signals for the respective drive module 30. The drive modules 30 are thereby controlled to physically and electrically connect with the functional module 40, Controlling the drive module 30 to connect with a functional module 40 may comprise controlling the drive module 30 to identify the position of the selected functional module 40 and move to that position. The position of the selected functional module 40 may be determined based on information received in the command to connect the drive module 30 with the functional module 40. Alternatively, the command to connect the drive module 30 and the functional module 40 is transmitted to both the drive module 30 and the functional module 40, whereby the functional module 40 prepares for the connection and starts transmitting a signal. The drive module 30 may then determine the position of the functional module based on this transmitted signal. The drive modules 30 are thus autonomously operated to find the selected functional module 40 and connect with that functional module 40. At least one sensor device 60 arranged at the drive modules 30 and/or the functional module 40 may be configured to sense when the physical and/or electrical connection has been performed. The at least one sensor device 60 may send a signal to the control device 200 of a drive module 30 indicating that the connection(s) have been performed. Based on the signal from the at least one sensor device 60, the control device 200 may send a verification signal to the control device 100 of the off-board system for verification of the connection(s). The control device 100 may then generate a unique vehicle identity for the assembled vehicle 1. A vehicle 1 is thus assembled and the vehicle 1 is ready to perform the mission.

The assembled vehicle 1 in FIG. 1 comprises a first drive module 30*a*, a functional module 40 and a second drive module 30*b*. However, it should be understood that the assembled vehicle 1 may comprise more than two drive modules 30. Also, the assembled vehicle 1 may comprise more than one functional module 40. In any case, the at least one functional module 40 is arranged for carrying a load, and the at least one functional module 40 is releasably connected with the first drive module 30*a* that is configured to be autonomously operated. The load of the vehicle 1 is a load in the at least one functional module 40, which thus constitutes the load of the vehicle 1. If the vehicle 1 comprises several functional modules 40, the load of the vehicle 1 comprises all the individual loads in the functional modules 40.

The method is here illustrated as being performed by the control device 100 in the off-board system. However, one of the control devices 200, 300 of the set of modules 20 may alternatively control the procedure. The present description for simplicity only describes to select a first and a second drive module, but it should be understood that more drive modules may be selected, e.g. a third drive module, a fourth module etc., to be used for assembling the same vehicle 1.

Figure 5A:
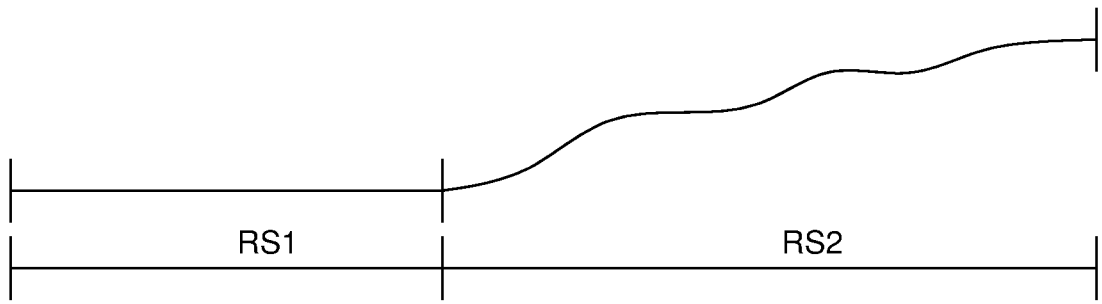
FIGS. 5A-5B illustrates some examples of route segments of two different planned routes.
Figure 5B:
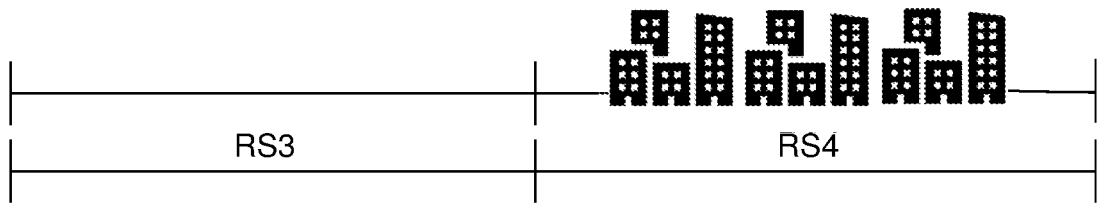

FIGS. 5A and 5B illustrates some examples of route segments of two different planned routes. In FIG. 5*a*, the planned route comprises a first route segment RS1 with a flat road. A speed restriction of 60 km/h is present. A vehicle 1 may thus drive with a high speed along the route segment RS1, and a drive module 30 designed for driving efficiently at high speed is for example selected. The planned route also comprises a second route segment RS2, with an uphill. The vehicle 1 may need much power to be able to climb the hill of the route segment RS2, and a drive module 30 designed for giving high power output is for example selected. When driving along RS1, the vehicle 1 will then use the drive module 30 designed for driving efficiently at high speed for driving the vehicle 1, and the other drive module 30 of the vehicle 1 will e.g. only follow. When driving along RS2, the vehicle 1 will then use the drive module 30 designed for giving high power output, and the other drive module 30 of the vehicle 1 will e.g. only follow.

In FIG. 5B, the planned route comprises a first route segment RS3 with a flat road, similar to the route segment RS1, and a drive module 30 designed for driving efficiently at high speed is for example selected. The planned route also comprises a second route segment RS4, in an urban setting. In the urban setting it is only allowed to drive at 40 k/m, and a drive module 30 designed for driving efficiently at medium or low speed is for example selected. Thus, when driving along RS3, the vehicle 1 will then use the drive module 30 designed for driving efficiently at high speed for driving the vehicle 1, and when driving along RS4, the vehicle 1 will then use the drive module 30 designed for or driving efficiently at medium or low speed.

In some embodiments, the individual set of energy parameters is indicative of a gear ratio for the respective drive module 30. The selecting S2 a first drive module 30*a* then comprises, in some embodiments, selecting S2 a first drive module 30*a* having a gear ratio matching route information associated with the first route segment of the planned route. For example, the gear ratio is designed to give a very high power output to the wheels, e.g. to be able to start reliably, or climb a steep uphill. For example, if the vehicle is expected to have to start during the first route segment and the route information is indicative of an uphill, and/or the load of the functional module 40 is heavy. Then, the method comprises selecting a drive module 30 that has a gear ratio designed for reliable startability. Thus, a gear ratio that has a high probability for reliable startability. A gear ratio configured for reliable startability is typically high, for example 1:8-1:10. This corresponds to an associated speed of 10 km/h, or speed interval of 5-15 km/h. It may also correspond to an acceleration that is efficient for reliable startability. The gear ratio may for example be designed for a certain speed, speed interval, acceleration or acceleration interval. The selecting S3 a second drive module 30*b* comprises, in some embodiments, selecting S3 a second drive module 30*b* having a gear ratio matching route information associated with the second route segment of the planned route. Thus, another drive module 30 is selected that is optimized for another, second route segment. Typically, the gear ratio of the first drive module 30*a* then includes a gear ratio being different from any gear ratio of the second drive module 30*b*. For example, if a vehicle 1 comprising two or more drive modules 30 should be assembled, the method comprises selecting at least one drive module 30 having a gear ratio being different from any other gear ratio of any other drive module 30 of the vehicle 1. Thus, one drive module 30 may for example have one or two gear devices with gear ratio 1:1, 1:2 and 1:3. Another drive module 30 must then have one gear device with at least one different gear ratio, for example 1:4. Thereby, the drive modules 30 can have different optima considering e.g. efficient speed intervals. By selecting drive modules 30 of a vehicle 1 to have different gear ratios, a kind of electrical gear or transmission is achieved. Thereby, there is no need to have a mechanical gearbox. The electrical transmission is without disadvantages of a mechanical gear box, such as heavy weight, need of service and repair. As there is no gear box or clutch system, the vehicle becomes more silent. Hence, the ready assembled modular vehicle 1 can be operated in an energy efficient way, whereby power consumption may be reduced, and the propulsion systems may be exposed to less wear. This without abstaining reliable startability etc.

In some embodiments, the selecting S2 of the first drive module 30a comprises selecting a first drive module 30a which individual set of energy parameters is matching route information associated with the first route segment of the planned route such that the vehicle 1 is predicted to meet at least one efficiency criterion while travelling along the first route segment. A first route segment is thus a stretch of the planned route, as previously explained. In some embodiments, the selecting S3 of a second drive module 30b comprises selecting a second drive module 30b which individual set of energy parameters is matching route information associated with the second route segment of the planned route such that the vehicle 1 is predicted to meet at least one efficiency criterion while travelling along the second route segment. A second route segment is thus a stretch of the planned route being different from the first route segment, as previously explained. An efficiency criterion is for example that the vehicle 1 is able to start reliably. Another efficiency criterion is that the vehicle 1 gets the most power output with minimal used energy (e.g. used battery power) while travelling along the intended route segment. Still another efficiency criterion is that the vehicle 1 can drive with a desired speed, or within a desired speed interval, e.g. set by speed restrictions, along the route segment. Another efficiency criterion is that the vehicle 1 can accelerate with an acceleration or within an acceleration interval, along the route segment. With "predicted" is meant that there is a forecast or judgement, for example based on the mentioned scheme, that the vehicle 1 will meet the at least efficiency criterion. For example, the information or data in the scheme may be selected to meet at least one of the efficiency criteria.

In some embodiments, the individual set of energy parameters is indicative of a most efficient speed or speed interval, where the drive module 30 is driving most efficiently. Thus, the drive modules 30 have different speeds or speed intervals in which they operate most efficiently. Thus, a drive module 30 may be designed for driving with a low speed or in a low-speed interval. The energy parameters may thus indicate a low speed, e.g. 5, 10, 15 or 20 km/h. Alternatively, the energy parameters may indicate a speed interval, e.g. 5-20 km/h. Another drive module 30 may be designed for driving with a medium speed or in a medium-speed interval. The energy parameters may thus indicate a medium speed, e.g. 30, 40 or 50 km/h. Alternatively, the energy parameters may indicate a speed interval, e.g. 30-50 km/h. Still another drive module 30 may be designed for driving with a high speed or in a high-speed interval. The energy parameters may thus indicate a high speed, e.g. 60, 70 or 80 km/h. Alternatively, the energy parameters may indicate a speed interval, e.g. 60-80 km/h. The intervals thus differ from each other. The most efficient speed or speed interval is for example determined based on the gear ratio and available motor power of the drive module 30, as previously described. The selecting S2 a first drive module 30a then comprises selecting S2 a first drive module having a most efficient speed or speed interval matching route information associated with the first route segment of the planned route. Thus, if the route information associated with the first route segment indicates urban environment, then a drive module 30 which set of energy parameters indicative of a most efficient speed or speed interval for an urban environment is chosen, e.g. a drive module 30 designed for low speed or medium speed. Also, the selecting S3 a second drive module 30b comprises selecting S3 a second drive module having a most efficient speed or speed interval matching route information associated with the second route segment of the planned route. Thus, if the route information associated with the second route segment indicates extra-urban environment, then a drive module 30 which set of energy parameters indicative of a most efficient speed or speed interval for an extra-urban environment is chosen, e.g. a drive module 30 designed for high speed.

Thus, drive modules 30 can be selected that individually match different route segments. Typically, the most efficient speed of the first drive module is different from the most efficient speed of the second drive module. Alternatively, or in combination, the most efficient speed interval of the first drive module and the most efficient speed interval of the second drive module are at least partly non-overlapping. Thereby the ready assembled vehicle 1 will be configured to drive efficiently along at least two different road segments when driving along the route.

In some embodiments, the route information indicates a descent. Any of the selecting steps S2, S3 may then include to select a drive module 30 that has a SOC that is relatively low, to be able to regenerate braking torque when driving along the descent. In one alternative embodiment, the planned route is to drive to a destination, and then drive back the same way. An uphill to the destination will then be a downhill when driving back. One drive module 30 designed for uphill and one drive module 30 designed for downhill may then be selected.

Now turning back to FIG. 6, which illustrates the control device 100, 200, 300 configured to implement the proposed method in more detail. In some embodiments, the control device 100, 200, 300 is a "unit" in a functional sense. Hence, in some embodiments the control device 100, 200, 300 is a control arrangement comprising several physical control units that operate in corporation. The control device 100, 200, 300 comprises hardware and software. The hardware basically comprises various electronic components on a Printed Circuit Board, PCB. The most important of those components is typically a processor 201 e.g. a microprocessor, along with a memory 202 e.g. EPROM or a Flash memory chip. The software (also called firmware) is typically lower-level software code that runs in the microcontroller.

The control device 100, 200, 300, or more specifically the processor 201 of the control unit 20, is configured to cause the control device 100, 200, 300 to perform all aspects of the method described above and below. This is typically done by running computer program code stored in the memory 202 in the processor 201 of the control device 100, 200, 300.

The control device is for example a control device 100 of the off-board system. Alternatively, the control device is a control device 200 of a drive module 30 or a functional module 40. Alternatively, the control functionality is distributed between two or more of the control devices 100, 200, 300.

More particularly, the control device 100, 200, 300 is configured to assemble a vehicle 1 from a set of modules 20 to be arranged for travelling a planned route. The control device 100, 200, 300 is configured to obtain route information associated with route segments of the planned route. The control device is also configured to select a first drive module 30a which individual set of energy parameters is matching route information associated with a first route segment of the planned route, and to select a second drive module 30b which individual set of energy parameters is matching route information associated with a second route segment of the planned route. The control device 100, 200, 300 is also configured to command the first drive module 30a and the second drive module 30b to connect themselves with the at least one functional module 40.

In some embodiments, the individual set of energy parameters is indicative of a gear ratio for the respective drive module. The control device 100, 200, 300 is then configured to select a first drive module 30a having a gear ratio matching route information associated with the first route segment of the planned route; and to select a second drive module 30b having a gear ratio matching route information associated with the second route segment of the planned route; wherein the gear ratio of the first drive module 30a includes a gear ratio being different from any gear ratio of the second drive module 30b.

In some embodiments, the individual set of energy parameters is indicative of at least one of: a weight of the at least one functional module 40 and/or type of load of the at least one functional module 40; a motor power available for the drive module 30; a state of charge, SOC, available for the drive module 30.

In some embodiments, the control device 100, 200, 300 is configured to select a first drive module 30a which individual set of energy parameters is matching route information associated with the first route segment of the planned route such that the vehicle 1 is predicted to meet at least one efficiency criterion while travelling along the first route segment. The control device 100, 200, 300 is also configured to select a second drive module 30b which individual set of energy parameters is matching route information associated with the second route segment of the planned route such that the vehicle 1 is predicted to meet at least one efficiency criterion while travelling along the second route segment.

In some embodiments, the individual set of energy parameters is indicative of a most efficient speed or speed interval, when the drive module 30 is driving most efficiently. The control device 100, 200, 300 is then configured to select a first drive module having a most efficient speed or speed interval matching route information associated with the first route segment of the planned route. The control device 100, 200, 300 is also configured to select a second drive module having a most efficient speed or speed interval matching route information associated with the second route segment of the planned route. Typically, the most efficient speed of the first drive module is different from the most efficient speed of the second drive module, and/or the most efficient speed interval of the first drive module and the most efficient speed interval of the second drive module are at least partly non-overlapping.

The terminology used in the description of the embodiments as illustrated in the accompanying drawings is not intended to be limiting of the described method; control arrangement or computer program. Various changes, substitutions and/or alterations may be made, without departing from invention embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A method, performed in a control device, for assembling a vehicle from a set of modules to be arranged for travelling a planned route, wherein the set of modules comprises: at least one functional module; and a plurality of drive modules, wherein each drive module comprises a pair of wheels, at least one electrical motor arranged to operate the pair of wheels, each said drive module is configured to be autonomously operated and is individually associated with an individual set of energy parameters, and wherein each module in the set of modules comprises at least one interface releasably connectable to a corresponding interface on another module, the method comprising:
   obtaining route information associated with route segments of the planned route;
   selecting a first drive module from the plurality of drive modules in which the individual set of energy parameters of said first drive module matches route information associated with a first route segment of the planned route;
   selecting a second drive module from the plurality of drive modules in which the individual set of energy parameters of said second drive module matches route information associated with a second route segment of the planned route; and
   commanding the first drive module and the second drive module to connect themselves with the at least one functional module.

2. The method according to claim 1, wherein the route information comprises information about at least one of topology, speed restrictions, road conditions, and/or traffic conditions.

3. The method according to claim 1, wherein the individual set of energy parameters for each of the plurality of drive modules is indicative of a gear ratio for the respective drive module,
   wherein the selecting a first drive module comprises selecting a first drive module having a gear ratio matching route information associated with the first route segment of the planned route; and
   wherein the selecting a second drive module comprises selecting a second drive module having a gear ratio matching route information associated with the second route segment of the planned route; wherein the gear ratio of the first drive module includes a gear ratio being different from any gear ratio of the second drive module.

4. The method according to claim 1, wherein the individual set of energy parameters for each of the plurality of drive modules is indicative of at least one of: a weight of the at least one functional module and/or type of load of the at least one functional module; a motor power available for the drive module; and/or a state of charge available for the drive module.

5. The method according to claim 1,
wherein the selecting of the first drive module comprises selecting a first drive module having an associated individual set of energy parameters that is matching route information associated with the first route segment of the planned route such that the vehicle is predicted to meet at least one efficiency criterion while travelling along the first route segment; and/or
wherein the selecting of a second drive module comprises selecting a second drive module having an associated individual set of energy parameters that is matching route information associated with the second route segment of the planned route such that the vehicle is predicted to meet at least one efficiency criterion while travelling along the second route segment.

6. The method according to claim 1, wherein the individual set of energy parameters is indicative of a most efficient speed or speed interval, where the drive module associated with the individual set of energy parameters is driving most efficiently, and
wherein the selecting a first drive module comprises selecting a first drive module having a most efficient speed or speed interval matching route information associated with the first route segment of the planned route; and
wherein the selecting a second drive module comprises selecting a second drive module having a most efficient speed or speed interval matching route information associated with the second route segment of the planned route, wherein the most efficient speed of the first drive module is different from the most efficient speed of the second drive module, and/or wherein the most efficient speed interval of the first drive module and the most efficient speed interval of the second drive module are at least partly non-overlapping.

7. A computer program product comprising computer program code stored on a non-transitory computer-readable medium, said computer program product used for assembling a vehicle from a set of modules to be arranged for travelling a planned route, wherein the set of modules comprises: at least one functional module; a plurality of drive modules, wherein each drive module comprises a pair of wheels, at least one electrical motor arranged to operate the pair of wheels, each said drive module is configured to be autonomously operated and is individually associated with an individual set of energy parameters, and wherein each module in the set of modules comprises at least one interface releasably connectable to a corresponding interface on another module, said computer program code comprising computer instructions to cause one or more control devices to perform the following operations:
obtaining route information associated with route segments of the planned route;
selecting a first drive module from the plurality of drive modules in which the individual set of energy parameters of said first drive module matches route information associated with a first route segment of the planned route;
selecting a second drive module from the plurality of drive modules in which the individual set of energy parameters of said second drive module matches route information associated with a second route segment of the planned route; and
commanding the first drive module and the second drive module to connect themselves with the at least one functional module.

8. A control device (100, 200, 300) for assembling a vehicle from a set of modules to be arranged for travelling a planned route, wherein the set of modules comprises: at least one functional module; a plurality of drive modules, wherein each drive module comprises a pair of wheels, at least one electrical motor arranged to operate the pair of wheels, each said drive module is configured to be autonomously operated and is individually associated with an individual set of energy parameters, and wherein each module in the set of modules comprises at least one interface releasably connectable to a corresponding interface on another module, wherein the control device is configured to:
obtain route information associated with route segments of the planned route;
select a first drive module from the plurality of drive modules in which the individual set of energy parameters of said first drive module matches route information associated with a first route segment of the planned route;
select a second drive module from the plurality of drive modules in which the individual set of energy parameters of said second drive module matches route information associated with a second route segment of the planned route; and
command the first drive module and the second drive module to connect themselves with the at least one functional module.

9. The control device according to claim 8, wherein the route information comprises information about at least one of topology, speed restrictions, road conditions, and/or traffic conditions.

10. The control device according to claim 8, wherein the individual set of energy parameters for each of the plurality of drive modules is indicative of a gear ratio for the respective drive module, and wherein the control device is configured to:
select a first drive module having a gear ratio matching route information associated with the first route segment of the planned route;
select a second drive module having a gear ratio matching route information associated with the second route segment of the planned route; wherein the gear ratio of the first drive module includes a gear ratio being different from any gear ratio of the second drive module.

11. The control device according to claim 8, wherein the individual set of energy parameters for each of the plurality of drive modules is indicative of at least one of: a weight of the at least one functional module and/or type of load of the at least one functional module; and/or a motor power available for the drive module; a state of charge available for the drive module.

12. The control device according to claim 8, wherein the control device is configured to:
select a first drive module having an associated individual set of energy parameters that is matching route information associated with the first route segment of the planned route such that the vehicle is predicted to meet at least one efficiency criterion while travelling along the first route segment and/or select a second drive module having an associated individual set of energy parameters that is matching route information associated with the second route segment of the planned route such that the vehicle is predicted to meet at least one efficiency criterion while travelling along the second route segment.

13. The control device according to claim 8, wherein the individual set of energy parameters is indicative of a most efficient speed or speed interval, when the drive module associated with the individual set of energy parameters is driving most efficiently, and wherein the control device is configured to:
  select a first drive module having a most efficient speed or speed interval matching route information associated with the first route segment of the planned route; and
  select a second drive module having a most efficient speed or speed interval matching route information associated with the second route segment of the planned route, wherein the most efficient speed of the first drive module is different from the most efficient speed of the second drive module, and/or wherein the most efficient speed interval of the first drive module and the most efficient speed interval of the second drive module are at least partly non-overlapping.

14. A drive module configured to be autonomously operated and is individually associated with an individual set of energy parameters, wherein the drive module comprises a pair of wheels, at least one electrical motor arranged to operate the pair of wheels, and at least one interface releasably connectable to a corresponding interface on another module, wherein said drive module is associated with a control device configured to:
  obtain route information associated with route segments of a planned route;
  select said drive module for either a first route segment or a second route segment of the planned route based on the individual set of energy parameters of said drive module that matches route information associated with one of the first or the second route segment of the planned route; and
  command the drive module to connect to at least one other drive module and to at least one functional module.

15. A modular vehicle comprising a set of modules arranged for travelling a planned route, wherein the set of modules comprises:
  at least one functional module;
  a plurality of drive modules, wherein each drive module comprises a pair of wheels, at least one electrical motor arranged to operate the pair of wheels, each said drive module is configured to be autonomously operated and is individually associated with an individual set of energy parameters, and wherein each module in the set of modules comprises at least one interface releasably connectable to a corresponding interface on another module; and
  at least one control device that assembled the set of modules to form the vehicle by:
    obtaining route information associated with route segments of the planned route;
    selecting a first drive module from the plurality of drive modules in which the individual set of energy parameters of said first drive module matches route information associated with a first route segment of the planned route;
    selecting a second drive module from the plurality of drive modules in which the individual set of energy parameters of said second drive module matches route information associated with a second route segment of the planned route; and
    commanding the first drive module and the second drive module to connect themselves with the at least one functional module.

* * * * *